United States Patent [19]

Gruetman

BEST AVAILABLE COPY

[11] 3,895,258

[45] July 15, 1975

[54] DEFLECTION LINEARITY CORRECTION CIRCUIT

[75] Inventor: Weldon W. Gruetman, Hicksville, Ohio

[73] Assignee: International Telephone & Telegraph Corporation, Nutley, N.J.

[22] Filed: Feb. 4, 1974

[21] Appl. No.: 439,458

[52] U.S. Cl. .......... 315/371
[51] Int. Cl. .......... H01j 29/70
[58] Field of Search .......... 315/370, 371

[56] References Cited

UNITED STATES PATENTS 3,349,279 10/1967 Schafft .......... 315/370
3,723,804 3/1973 Yasumatsuya .......... 315/370

*Primary Examiner*—T. H. Tubbesing
*Attorney, Agent, or Firm*—John T. O'Halloran; Menotti J. Lombardi, Jr.; Edward Goldberg

[57] ABSTRACT

Distortion in the deflection driver circuit of an electron beam scanning device is corrected by adding a controlled pulse to the shaping capacitor across the deflection coil during the retrace interval. A pulse generator controls a transistor switch across the capacitor and provides a saw-tooth waveform which reduces the charge at the start of the scan period to compensate for distortion. The pulse width is adjustable to control the degree of linearity correction.

6 Claims, 2 Drawing Figures

DEFLECTION LINEARITY CORRECTION CIRCUIT

BACKGROUND OF THE INVENTION

1. Field of the Invention

This invention relates to linearity correction of distortion in an electron beam deflection driver circuit and to an improved circuit for controlling the waveform applied by a shaping capacitor to the scanning yoke coil.

2. Description of the Prior Art

A presently known energy recovery type horizontal deflection driver circuit employs a transistor and parallel diode switch which are connected in series with a deflection yoke coil and to a ringing capacitor. A further coil supplying a constant current is connected in series with the circuit to a source of voltage and an S-shaping capacitor is connected across the deflection coil to ground. The shaping capacitor applies a parabolic voltage waveform to the direct voltage component impressed across the deflection coil during scan time and provides a controlled damping to compensate for distortion of the normal non-linear saw-tooth sweep waveform. A similar type circuit is described in U.S. Pat. No. 3,349,279 issued Oct. 24, 1967. Due to circuit losses, a nonsymmetrical distortion occurs as the scan progresses which results in a decreasing rate of change of current that cannot be completely corrected. Another circuit for improving this non-linearity is shown in U.S. Pat. No. 3,428,853 issued Feb. 18, 1969.

SUMMARY OF THE INVENTION

It is therefore the primary object of the present invention to provide a novel circuit for correcting distortion in a deflection driver which is relatively simple, easily controlled and has improved linearity. This is accomplished by the addition of a one-shot pulse generator which controls an added transistor switch to apply a negative going saw-tooth waveform to the shaping capacitor and deflection coil during the retrace interval. The added pulse of current reduces the charge on the capacitor at the start of the scan period with the capacitor then recovering and charging at a constant rate during the following scan interval. The amount of linearity correction is controlled by adjusting the pulse width applied to the added switching transistor and shaping capacitor. The invention will be better understood from the following description taken in conjunction with the accompanying drawings.

DESCRIPTION OF THE PREFERRED EMBODIMENT

Figures 1, 2:
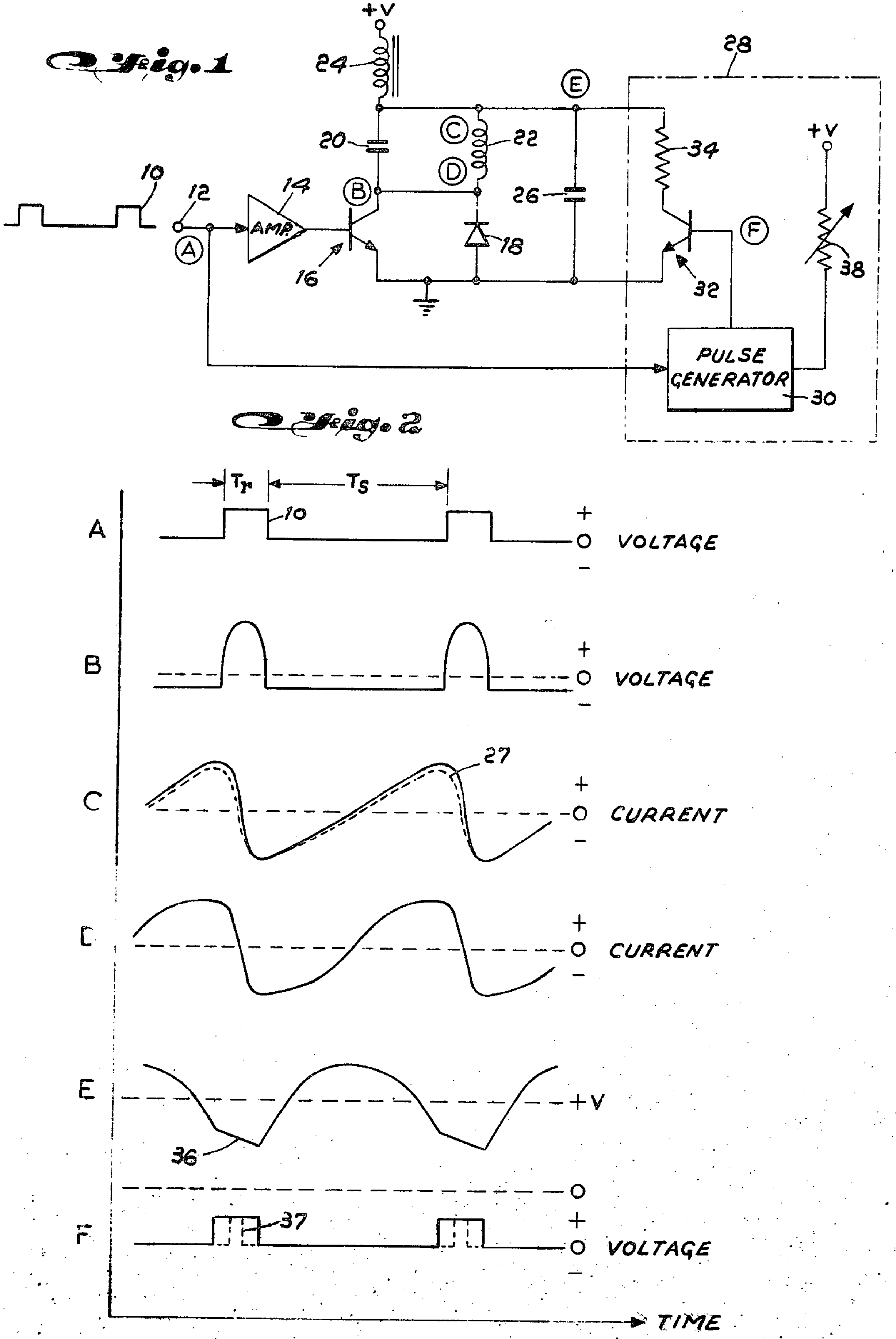
FIG. 1 schematically shows the present deflection linearity correction circuit with the novel portions indicated within the dashed lines.
FIG. 2 shows various pulse waveforms at designated locations in the circuit of FIG. 1.

As shown in FIG. 1, an input signal pulse 10, such as a horizontal drive pulse from a horizontal oscillator stage of a television receiver, is applied to the input terminal 12 of an energy recovery type deflection driver circuit. The circuit includes an amplifier stage 14, and a transistor 16 and parallel damper diode 18 which provide a switch. The transistor and diode are connected in series with a parallel combination of a ringing capacitor 20 and a deflection yoke coil 22. These are, in turn, connected via a coil 24 to the power supply voltage, V. Coil 24 provides a constant current to the circuit, with the other end of the transistor and diode being connected to a common reference point or ground. Alternatively, the ringing capacitor may be connected in parallel with the transistor diode switch to ground. An S-shaping capacitor 26 is connected across the coil 22 and diode 18 to ground. The amplifier 14 controls the state of the transistor 16-diode 18 switch which is normally on, or conducting, during the scan time and off during the retrace interval.

The operation of the known basic energy recovery type deflection drive circuit portion is as follows. During the scan time, designated as $T_s$ in waveform A, FIG. 2, the transistor-diode switch conducts and a constant voltage is applied across coil 22. The complementary constant voltage appearing across transistor 16 is indicated by the flat portion of waveform B. This causes a constant rate of change of current through coil 22, as shown by the straight rising line of waveform C. During the retrace period, $T_r$, the switch is opened by an incoming pulse 10 to amplifier 14, which cuts off transistor 16 causing the coil 22 and capacitor 20 to begin to ring. The voltage across coil 22 reverses and has a wave shape that is one-half cycle of a sinusoid, opposite in polarity to that of waveform B in FIG. 2. The value of capacitor 20 is in the order of tenths of a microfarad and is chosen so that the half cycle is equal in time to the retrace period during which the switch is off. The average voltage across coil 22 during retrace is approximately equal but of opposite polarity to the positive voltage supply, V. The current through coil 22 is the integral of the voltage thereacross, resulting in a current waveform C which is of one polarity at a start of scan, decreases in value through zero and ideally increases in the opposite polarity at a constant rate during the scan time. The current then reverses in a cosinusoidal manner during retrace time.

Coil 24 aids in providing a constant current to the circuit and an S-shaping capacitor 26, in the order of a few microfarads, provides a near parabolic type voltage wave shape such as partially shown at E during the scan period. This component is added to the direct voltage component applied across coil 22 during scan and provides some compensation for non-symmetrical distortion resulting from losses in the circuit. The effect of this distortion is to decrease the rate of current change with time as the scan progresses, so that the ideal linear saw-tooth waveform, shown at C, falls off toward the end of the scan period, as indicated by dashed line 27. While the known S-shaping capacitor introduces some degree of compensation of the type such as shown in waveform D, by increasing the sweep rate at the center of scan, this has been inadequate for many applications where greater linearity is desired.

In the present novel circuit, outlined in dashed line 28 of FIG. 1, a one-shot pulse generator 30, triggered by the incoming pulse 10, applies a pulse F of an adjustable time duration to another transistor switch 32 which is switched on during part of the retrace interval. Current through transistor 32 is determined by resistor 34 and the potential applied across capacitor 26. This pulse of current momentarily reduces the charge on capacitor 26, as shown by the negative going saw-tooth pulse 36 of waveform E. The charge then recovers during the following scan interval at a relatively constant rate due to the constant current characteristic of coil 24. Thus, the composite potential shown in waveform E, on capacitor 26 and across deflection yoke coil 22 during scan, includes three components. These are a direct voltage component due to the supply voltage V, a near parabolic component due to the S-shaping capacitor 26 and the negative going saw-tooth component 36 due to switching transistor 32 and resistor 34. Ideally, the peak-to-peak voltages are made equal about the fixed positive voltage supply level. Without the added pulse, the waveform E would be flat during retrace.

The amount of linearity correction is made adjustable by varying the time interval that transistor 32 is turned on during the retrace interval as shown at F. The variable pulse width 37 from generator 30 is controlled by the adjustable potentiometer 38 connected to the direct voltage supply, V. The corrected pulse of current through coil 22 then takes the form such as shown by waveform D. A slower scan rate thus occurs at the start of scan, a rapid scan rate follows during the mid-portion and a slower rate at the end of the scan period. The circuit effectively utilizes a boot-strapping action to apply the added pulse across both ends of coil 22. This provides a constant voltage to linearize the rate of current change and compensate for distortion.

The present invention thus provides an improved adjustable deflection linearity correction circuit with minimum distortion. While only a single embodiment has been illustrated and described, it is to be understood that other variations may be made in the particular design and configuration without departing from the scope of the invention as set forth in the appended claims.

I claim:

1. An electron beam deflection linearity correction circuit comprising:

means for providing a pulse input signal having a period between successive pulses equal to the electron beam scanning period and a pulse duration equal to the retrace period, first switching circuit means controlled by said input signal to conduct during said scanning period and cut off during said retrace period, a source of direct voltage having one terminal connected to a common reference point, deflection coil means connected between said first switching circuit means and the other terminal of said source, a ringing capacitor connected between said first switching circuit means and one of said terminals to provide a half-wave sinusoidal pulse signal to said deflection coil means during said retrace period, a shaping capacitor connected between said other terminal and said common reference to provide an S-shaping current waveform to said deflection coil means during said scanning period, and a second switching circuit means connected across said shaping capacitor to apply a saw-tooth voltage waveform pulse to reduce the charge on said shaping capacitor during said retrace period and cause a relatively constant charging rate during the following scanning period.

2. The device of claim 1 wherein said first switching means includes a first switching transistor and parallel diode, said second switching circuit means includes a pulse generator connected to said pulse input signal means to generate a pulse during said retrace period and a second switching transistor connected across said shaping capacitor and to said pulse generator for control by said generated pulse.

3. The device of claim 2 including a second coil connected in series between said deflection coil means and said other terminal of said source to provide a relatively constant current to said deflection coil during said scanning period.

4. The device of claim 3 including means for varying the duration of said generated pulse from said pulse generator.

5. The device of claim 4 including an amplifier stage connected between said pulse input signal means and said first switching transistor.

6. The device of claim 5 wherein said ringing capacitor is connected in parallel with said deflection coil means and said shaping capacitor is connected across both said deflection coil means and the parallel combination of said first switching transistor and diode serially connected to said deflection coil.

* * * * *